United States Patent [19]

Morscheck

[11] 4,375,171
[45] Mar. 1, 1983

[54] AUTOMATIC TRANSMISSION

[75] Inventor: Timothy J. Morscheck, Lathrup Village, Mich.

[73] Assignee: Eaton Corporation, Cleveland, Ohio

[21] Appl. No.: 178,429

[22] Filed: Aug. 15, 1980

Related U.S. Application Data

[63] Continuation of Ser. No. 884,078, Mar. 6, 1978, abandoned.

[51] Int. Cl.³ .............................................. F16H 3/08
[52] U.S. Cl. ...................................... 74/331; 74/359; 74/356
[58] Field of Search ................. 74/720, 359, 360, 331, 74/665 B, 665 D, 665 E, 356, 357, 730, 458, 424.5

[56] References Cited

U.S. PATENT DOCUMENTS

| | | | |
|---|---|---|---|
| Re. 25,458 | 10/1963 | Barth et al. | 74/359 |
| 2,355,709 | 8/1944 | Dodge | 74/720 |
| 2,500,308 | 3/1950 | Campodonico et al. | 74/331 |
| 2,612,787 | 10/1952 | Youngren et al. | 74/359 |
| 2,633,753 | 4/1953 | Campodonico | 74/331 |
| 2,787,167 | 4/1957 | Schwab | 74/359 |
| 2,972,899 | 2/1961 | Wiggerman | 74/331 |
| 3,064,488 | 11/1962 | Lee et al. | 74/359 |
| 3,138,965 | 6/1964 | Brey et al. | 74/331 |
| 3,173,303 | 3/1965 | Galaniuk | 74/360 |
| 3,442,155 | 5/1969 | Clark | 74/720 |
| 3,817,123 | 6/1974 | Whately et al. | 74/360 X |
| 4,106,358 | 8/1978 | Morrison | 74/331 |
| 4,116,082 | 9/1978 | Kelbel | 74/331 X |

FOREIGN PATENT DOCUMENTS 2312867 9/1973 Fed. Rep. of Germany ........ 74/331

Primary Examiner—Leslie A. Braun
Assistant Examiner—Lawrence J. Gotts
Attorney, Agent, or Firm—C. H. Grace; P. S. Rulon

[57] ABSTRACT

Disclosed is a power shift transmission having two input shafts, an output shaft, two countershafts which are first synchronized and clutched with either of the input shafts, and then alternately clutched to the output shaft. Each countershaft rotatably supports a ratio gear driven by one of the input shafts, a ratio gear driven by the other input shaft, and a drive gear for driving the output shaft. A reverse gear is rotatably supported by one of the countershafts. A double acting synchronizer is disposed between the two ratio gears on each countershaft for synchronizing and clutching either of the ratio gears to the countershaft. A hydraulically actuated friction clutch is disposed adjacent the drive gear on each countershaft for clutching the countershaft to the driven gear. One of the input shafts is a torque converter driven shaft; this shaft drives the ratio gears which are first and second speeds and the reverse gear. The other input shaft is a torque converter bypass shaft; this shaft drives the ratio gears which are third and fourth speeds. The transmission utilizes helical gears and the helical angle direction of the ratio and drive gears on the countershafts are such that axial forces on the contact teeth of the gears impart bending stresses on the countershaft which subtract from bending stresses on the shaft caused by radial forces on the contacting teeth of the gears.

27 Claims, 5 Drawing Figures

AUTOMATIC TRANSMISSION

This is a continuation, of application Ser. No. 884,078 filed Mar. 6, 1978 now abandoned.

FIELD OF THE INVENTION

This invention relates to ratio shifting transmissions and in particular to such transmissions adapted for power shifting and for use in land vehicles.

BACKGROUND OF THE INVENTION

It is known in the transmission art to first synchronize and clutch an intermediate shaft or ratio gear with the transmission output and to then clutch the intermediate shaft or ratio gear to the transmission input. Such synchronizing, which may be referred to as output synchronizing, is also known in prior art transmissions having plural countershafts. Many prior art transmissions, which employ plural countershafts and output synchronizing, power shift from one countershaft to another to upshift or downshift the transmission and synchronize a non-driving countershaft with the transmission output in preparation for the next shift.

When the above prior art transmissions are used in combination with a torque converter, the sole source of power input to the transmission is through the torque converter which is rather inefficient and not needed in the higher speed ratios of the transmission. To negate this inefficiency, torque converter bypass or lock out clutches have been used. Such clutches have the disadvantage in that they and their needed control systems may increase the cost and complexity of the transmissions.

SUMMARY OF THE INVENTION

An object of the invention is to provide a transmission which is low in initial cost and economical in use.

Another object of the invention is to provide a transmission which is readily shifted without a break in power between the transmission input and output.

According to a feature of the invention, the transmission includes an intermediate shaft which is free to rotate relative to the transmission input shaft and output shaft, means operative to synchronize the intermediate shaft with the input shaft, means thereafter operative to positively clutch the synchronized shafts together, and means thereafter operative to clutch the intermediate shaft to the output shaft.

According to another feature of the invention, the transmission includes a countershaft, two ratio gears and a drive gear rotatably supported by the countershaft, an output shaft having a gear in mesh with the drive gear, a first input shaft having a gear in mesh with one of the ratio gears, a second input shaft having a gear in mesh with the other ratio gear, means operative to synchronize either of the ratio gears with the countershaft, means operative to thereafter positively clutch the synchronized gear and shaft together, and means operative thereafter to clutch the countershaft with the drive gear.

According to another feature of the invention, the transmission includes two countershafts, two ratio gears and a drive gear rotatably supported by each countershaft, an output shaft having gear means in mesh with the drive gears, a first input shaft having gear means in mesh with one of the ratio gears on each countershaft, a second input shaft in mesh with the other ratio gears on each countershaft, means operative to synchronize and clutch one of the countershafts with either of the ratio gears supported thereby, means operative thereafter to clutch the one countershaft with the drive gear, means operative to synchronize and clutch the other countershaft with either of the ratio gears supported thereby, and means operative after the synchronizing and clutching of the other countershaft to clutch the other countershaft with drive gear supported thereby while the one countershaft is declutched from drive gear supported thereby.

According to another feature of the invention, the first input shaft of the last mentioned transmission is driven by a fluid power means and the second input shaft is driven by a shaft which bypasses the fluid power means.

BRIEF DESCRIPTION OF THE DRAWINGS

The preferred embodiment of the invention is shown in the accompanying drawings in which.

Certain terminology referring to direction and motion will be used in the following description. The terminology is for convenience in describing the preferred embodiment and should not be considered limiting unless explicitly used in the claims.

DETAILED DESCRIPTION OF THE PREFERRED EMBODIMENT

Figure 1:
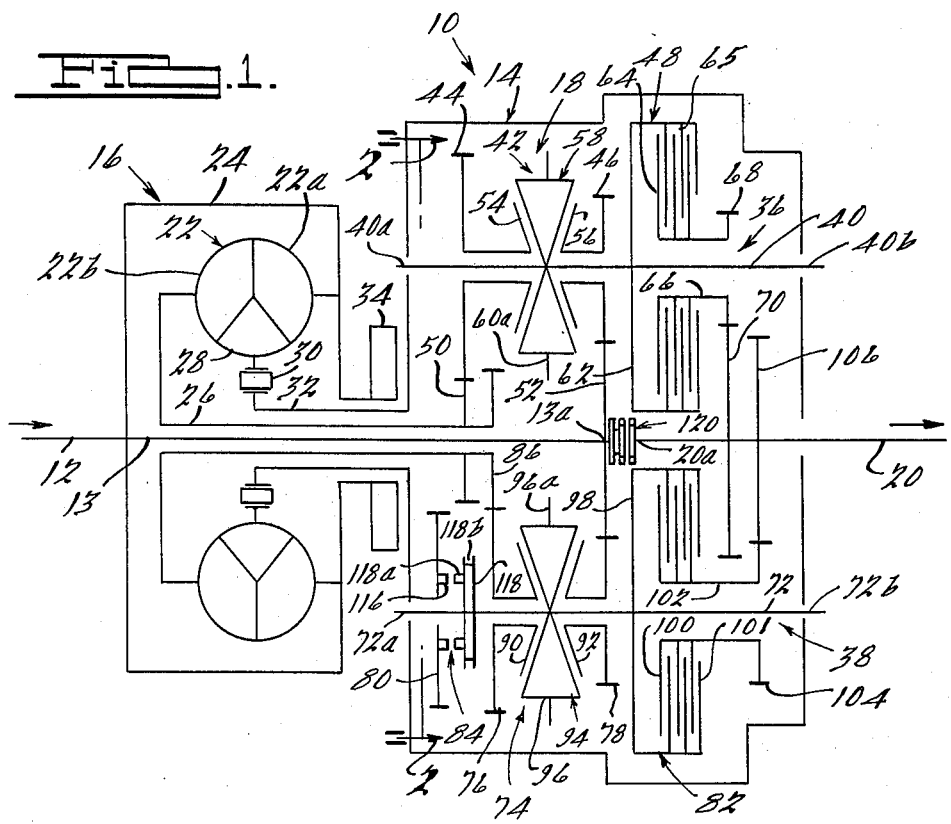
FIG. 1 is a schematic view of the transmission, looking in the direction of arrows 1—1 of FIG. 2.

Looking first at FIG. 1, therein is schematically illustrated a power shift transmission assembly 10 adapted for use in an unshown land vehicle, but not limited to such use. Transmission 10 is preferably automatically shifted by an unshown control system, which control system forms no part of the instant invention. Transmission 10 includes an input shaft 12 which may be directly driven by an unshown internal combustion engine, a housing assembly 14, a torque converter assembly 16, a ratio change gear assembly 18 which is driven by input shaft 12 through torque converter assembly 16 in first, second, and reverse ratios and is driven directly by a bypass input shaft 13 in third and fourth ratios, and an output shaft 20 axially aligned with input shafts 12 and 13.

The torque converter assembly 16 is conventional in that it includes a fluid coupling of the torque converter type having an impeller 22a driven by input shaft 12 through a shroud 24, a turbine 22b hydraulically driven by the impeller and in turn driving a sleeve shaft 26 which extends into gear assembly 18, and a runner or stator 28 which becomes grounded to housing 14 via a one-way roller clutch 30 carried by a sleeve shaft 32 fixed to housing assembly 14. Shroud 24 also drives a pump 34 for pressurizing the torque converter, for lubricating the transmission, and for selectively pressurizing friction clutches in gear assembly 18.

Sleeve 26 provides a fluid power or torque converter driven shaft for first, second, and reverse ratio gears in gear assembly 18. Bypass shaft 13 is in continuous direct drive with input shaft 12 and provides a torque converter bypass for driving third and fourth ratio gears; this arrangement of the bypass shaft negates the need of a separate torque converter bypass clutch.

Figure 2:
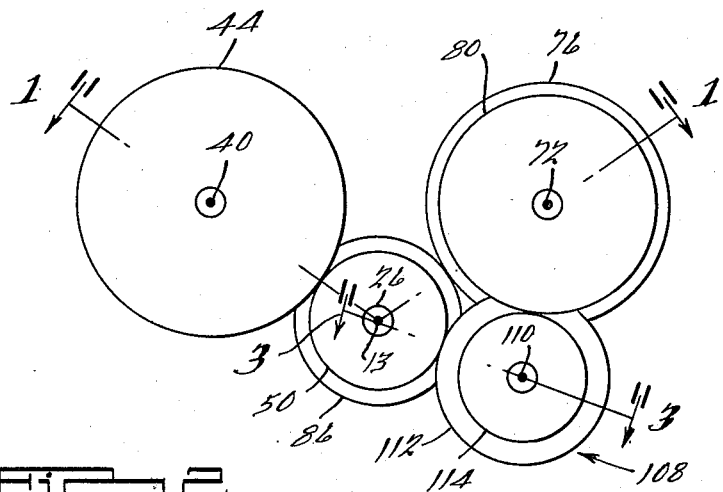
FIG. 2 is a schematic view of the transmission, looking in the direction of arrows 2—2 of FIG. 1.

Looking now at FIGS. 1 and 2, the schematically illustrated ratio change gear assembly includes two countershaft assemblies 36 and 38, which are disposed about axes which are parallel to and radially outward of an axis defined by shafts 12, 13, and 20. Assembly 36 includes a shaft 40 rotatably supported at its ends 40a and 40b by housing assembly 14, a double acting synchronizer clutch 42, first and third speed ratio gears 44 and 46 rotatable relative to and supported by shaft 40, and a hydraulically actuated friction clutch 48. First speed ratio gear 44 is driven by and in continuous mesh with an input drive gear 50 which is non-rotatably secured to bypass shaft 13. Synchronizer clutch 42 may be a conventional double acting synchronizer having a clutch member 54 at one end which is non-rotatably secured to gear 44, a clutch member 56 at the other end which is non-rotatably secured to gear 46, and a center clutch member 58 at the center which is non-rotatably secured to shaft 40. Center clutch member 58 may be slidably shifted leftwardly or rightwardly in a conventional manner to, respectively, couple gear 44 or 46 to shaft 40. Such slidable shifting of the center clutch member first frictionally couples countershaft 40 with one of the ratio gears and after synchronism is reached, then positively clutches the shaft with the gear via a jaw clutch shown in FIG. 3. Center clutch member 58 includes a radially extending flange portion 60a which may be gripped by an unshown shift fork to effect the leftward and rightward shifting in a conventional manner. Friction clutch 48 includes a housing member 62 non-rotatably secured to shaft 40, two sets of interdigitated disks 64 and 65, and a sleeve shaft 66 rotatably supported by shaft 40. Disks 64 are non-rotatably secured to sleeve shaft 66 and disks 65 are non-rotatably secured to housing member 62. Both disk sets are axially moveable in housing 62 and are frictionally interconnected in response to hydraulic pressure being selectively applied to an unshown piston in the housing member 62. Sleeve shaft 66 is non-rotatably secured to a drive gear 68 which is rotatably supported by shaft 40. Drive gear 68 is in continuous mesh with an output gear 70 which is non-rotatably secured to output shaft 20.

Countershaft assembly 38 differs from assembly 36 mainly in that it also includes a reverse ratio gear. Assembly 38 includes a shaft 72 rotatably supported at its ends 72a and 72b by housing assembly 14, a double acting synchronizer clutch 74, second, fourth and reverse speed ratio gears 76, 78, 80 which are rotatable relative to and supported by shaft 72, a hydraulically actuated friction clutch 82, and a positive type jaw clutch assembly 84. Clutch 84 may be a synchronized clutch similar to clutches 42 and 74. Second speed ratio gear 76 is driven by and in continuous mesh with an input drive gear 86 which is non-rotatably secured to torque converter driven shaft 26. Fourth speed ratio gear 78 is driven by and in continuous mesh with input drive gear 52 which is non-rotatably secured to bypass shaft 13. Synchronizer clutch 74 is a double acting clutch and may be identical to synchronizer 42. Synchronizer clutch 74 includes a clutch member 90 at one end which is non-rotatably secured to gear 76, a clutch member 92 at the other end which is non-rotatably secured to gear 78, and a center clutch member 94 at the center which is non-rotatably secured to shaft 72. Center clutch member 94 includes a radially extending flange portion 96a which may be gripped by an unshown shift fork to effect leftward and rightward shifts in the same manner as described for synchronizer 42. Friction clutch 82 may be identical to friction clutch 48. Friction clutch 82 includes a housing member 98 which is non-rotatably secured to shaft 72, two sets of disks 100 and 101, and a sleeve shaft 102 rotatably supported by shaft 72. Disks 100 are non-rotatably secured to sleeve shaft 102 and disks 101 are non-rotatably secured to housing member 98. Both disk sets are axially moveable in housing 98 and are frictionally interconnected in response to hydraulic pressure being selectively applied to an unshown piston in housing member 98. Sleeve shaft 102 is non-rotatably secured to a drive gear 104 which is rotatably supported by shaft 72. Drive gear 104 is in continuous mesh with an output gear 106 which is non-rotatably secured to output shaft 20.

Figure 3:
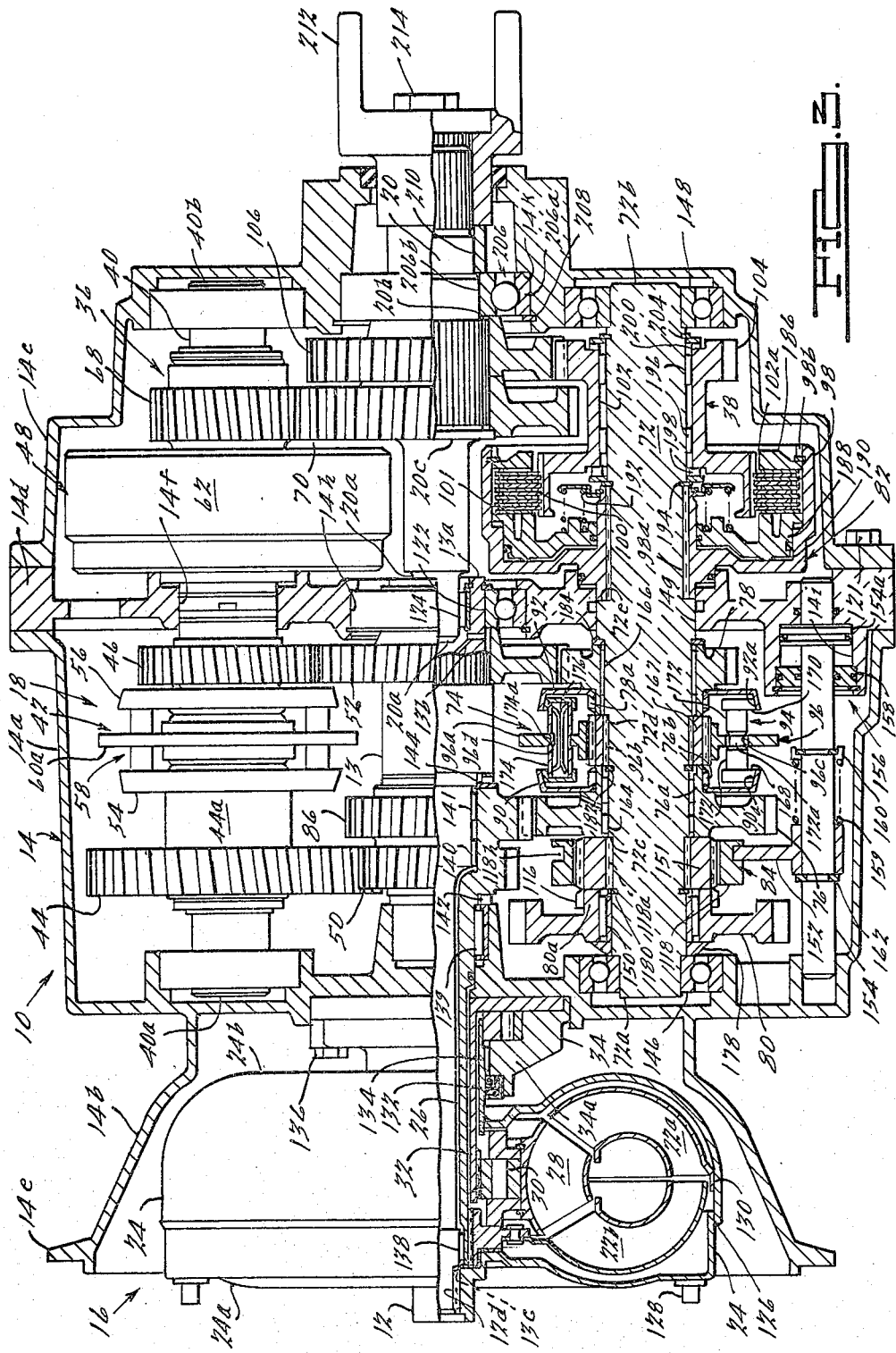
FIG. 3 is a detailed view of the transmission of FIG. 1, looking in the direction of arrows 1—1 of FIG. 2.
Figure 4:
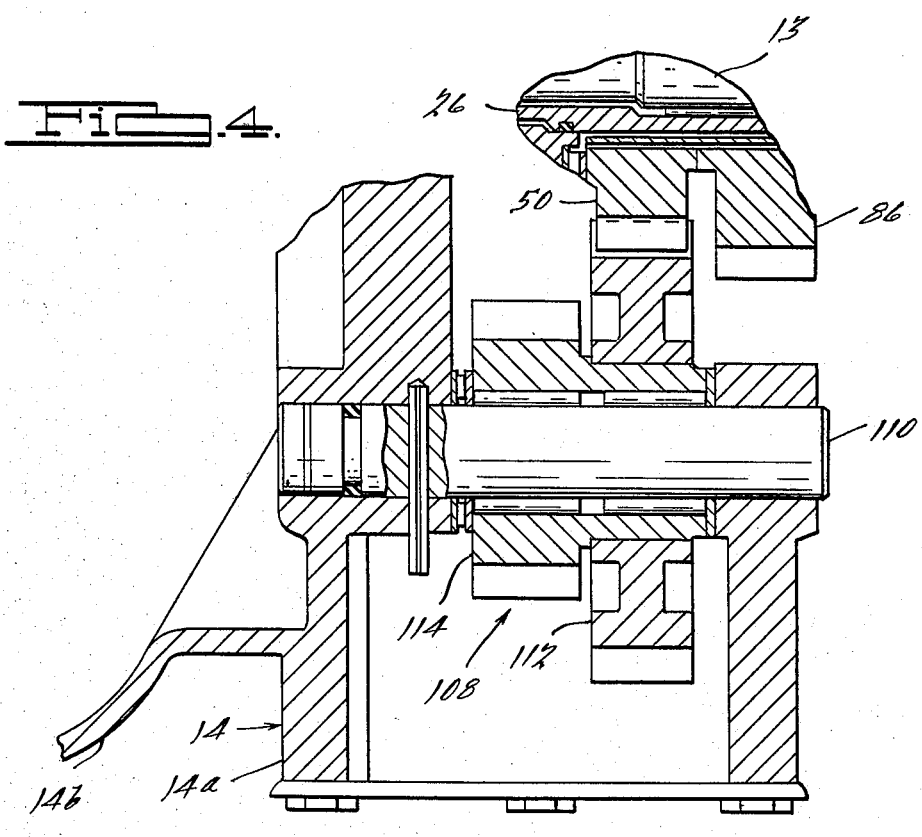
FIG. 4 is a detailed view of a portion of the transmission, looking in the direction of arrows 3—3 of FIG. 2.

Reverse gear 80 is rotatably supported by shaft 72 and is driven by an idler gear assembly 108, seen only in FIGS. 2 and 4. Idler gear assembly 108 includes a shaft 110 which is non-rotatably supported by housing assembly 14, a gear 112 which is rotatably supported on shaft 110 and in continuous mesh with input drive gear 50 which is driven by torque converter driven shaft 26, and a gear 114 which is rotatably supported on shaft 110 and non-rotatably secured to gear 112. Gear 114 is in continuous mesh with reverse gear 80. Jaw clutch assembly 84 includes jaw clutch teeth 116 which are non-rotatably secured to gear 80 and a jaw clutch member 118 mounted for sliding movement relative to shaft 72 and secured against rotation relative to shaft 72. Member 118 includes jaw clutch teeth 118a which engage with teeth 116 and an annular groove 118b which receives a shift fork 152 engaging the clutch in a conventional manner. Shift fork 152 is shown in FIG. 3.

By way of example, the ratios of ratio change gear assembly 18 are: first gear—4.05, second gear—2.22, third gear—1.42, fourth gear—1.00, and reverse gear—4.76. As may be seen, bypass shaft 13 and output 20 rotate at the same speeds when drive is through fourth gear.

Gear assembly 18 may also be provided with a direct drive clutch 120 at the confronting ends 13a and 20a and the bypass of output shafts 13 and 20 for bypassing fourth speed ratio drive through countershaft 38. Such a clutch may be a non-synchronized positive type jaw clutch as illustrated herein, since herein shafts 13 and 20 rotate at the same speeds in the fourth speed drive ratio. Further, the direct drive of clutch 120 could be used to provide a fifth speed ratio by decreasing the ratio spacing of first, second, third, and fourth ratio gears so that output shaft 20 would rotate slower than bypass shaft 13 when driving in fourth speed. When using clutch 120 to provide a fifth speed ratio, the clutch is preferably a fluid actuated friction clutch or a synchronized jaw clutch, both of which may be of a conventional type.

Looking now at FIGS. 3 and 4, therein the transmission of FIGS. 1 and 2 is disclosed in greater detail to show additional features not readily shown in a schematic. The transmission of FIGS. 3 and 4 does not include the direct drive clutch 120 but is otherwise the same as that previously described. Thus, in FIGS. 3 and 4 the numerals corresponding to those of FIGS. 1 and 2 will refer to parts already described.

In FIG. 3, housing assembly 14 includes a front housing member 14a having a bell housing portion 14b formed integral therewith, a rear housing member 14c, and an intermediate plate member 14d. Members 14a, 14c, and 14d are secured together via plurality of bolts 121, one of which is shown. A flange portion 14e of the bell housing provides means for securing the transmission to the rear of an engine housing. Intermediate plate 14d includes through bores 14f and 14g for the passage of shafts 40 and 72, a bore 14h having a bearing 122 disposed therein for rotatably supporting end 13a of shaft 13. End 20a of shaft 20 extends into a blind bore 13b in shaft 13 and is supported therein by a roller bearing 124. Intermediate plate 14d also includes several unshown oil passages for directing lubricating oil to various portions of the transmission and for directing oil to actuate clutches 48 and 82.

Shroud 24 of torque converter assembly 16 includes a front portion 24a and a rear portion 24b which are non-rotatably secured together at 126. Front portion 24a is integrally formed with a cup shaped portion defining shaft 12 and having internal splines 12a which receive splines 13c for driving shaft 13. Front portion 24a also includes a plurality of studs 128 for securing the transmission input to an unshown crankshaft or output shaft of an engine or motor. The rear portion 24b is fixed to impeller 22a at 130 and is welded to a sleeve 132. Sleeve 132 rotatably supports the rear portion 24a via a bearing 134 and drives pump 34. Pump 34 may be a well known crescent gear pump. Bearing 134 is supported by pump housing 34a which is bolted to housing portion 14a via a plurality of bolts 136. Shafts 13 and 26 are rotatably supported relative to each other and housing assembly 14 via roller bearings 138, 139, 140, 141, and, as previously mentioned, by bearing 122. Shafts 13 and 26 are axially retained relative to housing assembly 14 and each other by a ball bearing 122 and roller bearings 142 and 144.

Looking now at cross-sectioned countershaft 38, ends 72a and 72b of shaft 72 are supported by ball bearings 146 and 148 which also axially retain the shaft. Reverse gear 80 is rotatably supported on shaft 72 by a roller bearing 150 and includes an axially extending portion 80a having external splines defining jaw clutch teeth 116 of the jaw clutch assembly 84. Clutch assembly 84 further includes a ring member 151 splined on its I.D. to shaft 72 and splined on its O.D. to jaw clutch teeth 118a of member 118. Annular groove 118b in member 118 receives a shift fork 152 which is slidably connected to a shift rod 154 of an actuator 156. Actuator 156 includes a piston portion 154a formed on or fixed to rod 154 and disposed in a cylinder 14a cast into intermediate plate 14d, and an end plate 158 for closing the cylinder. A spring 159 disposed between a snap ring assembly 160 and shift fork 152 resiliently urges clutch teeth 118a into engagement with clutch teeth 116 in response to leftward movement of rod 154 and piston 154a. A snap ring 162 contacts the shift fork for disengaging the jaw clutch in response to rightward movement of the rod and piston. Cylinder 14i is provided with oil on both sides of piston 154a by unshown passages in intermediate plate 14d. Hydraulic sealing of the piston and cylinder is provided by O-ring seals in a conventional manner. Hydraulic actuators for shifting synchronizers 42 and 74 are provided in a similar manner.

Gear 76 includes an axially extending sleeve portion 76a having external jaw clutch splines 76b which receive internal splines of clutch member 90. Gear 76 and sleeve portion 76a are rotatably supported on shaft 72 by a pair of roller bearings 164. In a like manner, gear 44 of countershaft assembly 36 includes an axially extending portion 44a, but of longer length, splined to clutch member 54 and unshown roller bearings for rotatably supporting the gear and sleeve portion on shaft 40. In a similar manner, gear 78 is rotatably supported on shaft 72 by a roller bearing 166 and includes an axially extending portion having external jaw clutch splines 78a which receive internal splines of clutch member 92. Gear 46 is rotatably mounted on shaft 40 and connected to clutch member 56 in the same manner.

Double acting synchronizer 74, of which members 90 and 92 are part, is well known in the prior art. The synchronizer and in particular center clutch 94 includes a sleeve 167 splined on its I.D. to shaft 72 and on its O.D. to internal jaw clutch splines 96b of a slidable positive type jaw clutch member 96 integrally formed with flange portion 96a, a pair of friction cone rings 168 and 170 rigidly secured together by three circumferentially positioned pins 172, and a pair of internal friction cone surfaces 90a and 92a which are engageable with external cone surfaces defined by rings 168 and 170. Pins 172, which extend through three chamfered openings 96c circumferentially positioned in flange 96a, have at their centers (the position of the flange in its neutral position) an annular groove 172a having chamfered ends. The I.D. of each chamfered opening 96c is slightly greater than the major O.D. of each pin 172. Annular grooves 172a are slightly wider than the flange. Center clutch member 94 further includes three axially split pins 174 extending through three chamfered openings 96d which are alternately spaced between openings 96c. Pins 174 each consist of a pair of semicylindrical halves which are biased apart by a leaf spring 176. Each pair of semicylindrical halves define an annular groove 174a having chamfered ends. Annular groove 174a is formed by a semiannular groove defined by each pin half. Spring 176 biases the semiannular grooves outward into engagement with openings 96d. The I.D. of openings 96d is slightly greater than the major O.D. of pins 174. Annular grooves 174a closely fit the width of flange 96a.

The center clutch member 94 is shown in the neutral position, therefor both gears 76 and 88 are disengaged, the friction cone surfaces are slightly spaced apart, pins 172 and 174 and their respective grooves are concentric with openings 96c and 96d, and the semiannular grooves defining grooves 174a are biased into engagement with holes 96d. When it is desired to couple gear 76 to shaft 72, flange portion 96a is moved axially to the left by an appropriate shift mechanism. Such movement, which is transmitted through split pins 174, shifts the cone surface of cone ring 168 into contact with cone surface 90a. This contact (provided gear 76 and flange 96a are not synchronous with each other) causes pins 172 to move out of concentric alignment with openings 96c, whereby the chamfers of the openings 96c and the chamfers of the grooves 172a engage and prevent further axial movement of the flange due to torque at the interface of the chamfers. As synchronous speeds are reached, the torque at the interface of the chamfers diminishes and the axial force on flange 96a moves pins 172 back into a concentric relationship with openings 96c, thereby allowing flange 96a and jaw member 96 to move axially to the left for engaging jaw clutch splines 96b with jaw clutch splines 76b. Gear 78 is coupled to shaft 72 in the same manner by moving the flange righward.

The transmission gears are preferably helical gears and as such they are axially loaded with substantial forces when they are transmitting torque. Further, since the gears are in continuous mesh, they rotate at different speeds. Hence, it is preferred that the gears be axially isolated from each other to prevent the transmittal of the axial forces across surfaces rotating at different speeds to reduce wear and energy losses. Isolation and axial retention of gears 80, 76, and 78 is as follows:

Gear 80 is retained against axial movement relative to shaft 72 in the leftward direction by a thrust plate 178 and in the rightward direction through ring member 151 by a shoulder 72c defined by a step in shaft 72. Shoulder 72c prevents axial loading being imposed on gear 76 when gear 80 is engaged. Gear 76 is retained against axial movement relative to shaft 72 in the leftward direction through ring member 151 by a snap ring 180 and in the rightward direction through ring member 167 which abuts a shoulder 72d defined by a step in shaft 72. Gear 78 is retained against axial movement relative to shaft 72 in the leftward direction through ring member 167 by a snap ring 182 and in the rightward direction by a thrush plate 184.

Friction clutch 82, which is structurally and functionally conventional and identical to clutch 48, includes the housing member 98 splined to shaft 72 at 98a, the set of disks 101 which are slidably splined to internal splines 98b defined by the housing member, the set of disks 100 which are slidably splined to external splines 102a defined by an extension of sleeve 102, a reaction member 186 which is non-rotatably secured to housing member 98 by splines 98b, a piston 188 for squeezing the disks together in response to pressurized fluid being introduced into a chamber 190 defined by housing member 98 and piston 188, and a return spring 192 for retracting the piston. Housing member 98 is axially retained by a shoulder 72e defined by a step in shaft 72 and a snap ring 194. Sleeve 102 and gear 104 are rotatably supported on shaft 72 by a pair of roller bearings 196 and are axially retained by snap rings 194 and 204 through thrust bearings 198 and 200.

The gear 68 and clutch 48 of countershaft assembly 36 are rotatably and axially retained on shaft 40 in a similar manner.

Output shaft 20 is rotatably supported by the roller bearing 124 and a ball bearing 206. The outer race 206a of bearing 206 is supported by housing portion 14c and is axially retained thereto by a shoulder 14k and a snap ring 208. Axial retention of shaft 20 is provided by the inner race 206b of bearing 206 which is sandwiched between a shoulder 20b defined by shaft 20 and a spacer sleeve 210. Sleeve 210 is held in place by an output yoke 212 which is splined to shaft 20 and axially retained by a bolt 214. Output gears 70 and 106 are splined to shaft 20 and are retained in the leftward direction by a flange portion 20c defined by shaft 20 and in the rightward direction by the inner race 206b.

OPERATION

In reviewing the operation, it will be assumed that the transmission 10 is installed in a land vehicle having an internal combustion engine, that the engine crankshaft is connected to torque converter shroud 24 by studs 128, that the crankshaft rotates the shroud clockwise when viewing the shroud from the front, and that a shift control system will automatically effect shifting to the desired speed ratios in the proper sequence. Such control systems are well known and are often made responsive to parameters such as engine load and vehicle speed. It will also be assumed that the control system includes a shift control lever which is selectively placed in neutral to disengage the transmission, or in drive to effect forward movement of the vehicle, or in reverse to effect reverse movement of the vehicle. The shift control system referred to herein is by way of example only and does not form part of the invention herein or any preferred form of a control system.

With the shift control lever in neutral and the engine running, bypass shaft 13 and torque converter driven shaft 26 rotate clockwise and rotate input drive gears 50, 86, and 52 clockwise, whereby driven gears 44, 46, 76, 78 rotate counterclockwise and gear 80 rotates clockwise since it is driven through idler gear assembly 108. Further, countershafts 40 and 72 are completely disconnected from the transmission input and output since synchronizers 42 and 74 and fluid actuated clutches 48 and 82 are disengaged while the shift control lever is in neutral.

Assuming now that a vehicle operator places the shift control lever in drive and wishes to accelerate the vehicle in a forward direction to a speed which will cause the control system to sequentially upshift through each of the four forward ratio gears. When the shift lever is placed in drive, the control system connects the torque converter driven shaft to the output shaft through the first speed ratio gear in the following sequence: (1) synchronizer flange 60a is moved slightly to the left by an appropriate actuator (not shown) to effect a frictional connection of the first gear 44 to shaft 40, whereby shaft 40, which is disconnected from the output shaft, is pulled up toward synchronous speed with gear 44 thereby rotating countershaft 40 relative to gear 68 since gear 68 is unclutched at this time; (2) Flange 60a will then move further to the left and clutch gear 44 to shaft 40 by the jaw clutch in the synchronizer when the synchronous speed is reached; and (3) Clutch 48 is then actuated by pressurized fluid. First gear is now fully engaged.

When engine load decreases and vehicle speed increases to predetermined amounts, the torque converter driven shaft is connected to the output through the second speed ratio gear in the following sequence:
(1) Synchronizer flange 96a is moved slightly to the left by an unshown actuator to effect a frictional connection of the second gear 76 to shaft 72, whereby shaft 72, which is disconnected from the output shaft, is pulled up toward synchronous speed with gear 76;
(2) Flange 96a will then move further to the left and clutch gear 76 to shaft 72 by the jaw clutch in the synchronizer when the synchronous speed is reached;
(3) Clutches 48 and 82 are then deactuated and actuated, respectively, to drivingly disconnect shaft 40 and drivingly connect shaft 72; and (4) Flange 60a is then moved back to its neutral position to disengage the synchronizer. Second gear is now fully engaged and first gear is disengaged. In the foregoing sequence in upshifting to second gear, it should be noted that shaft 72 is synchronized with gear 76 through a drive connection with the transmission input and while drive is through the first gear and shaft 40. Such synchronizing may be characterized as input synchronizing. The other ratio gears and the associated countershafts are synchronized in a like manner.

When engine load decreases and vehicle speed increases to a predetermined amount, bypass shaft 13 is then connected to the output shaft through third speed ratio gear 46 in a four step sequence similar to the above sequence for second gear: (1) Flange 60a is moved slightly to the right to frictionally connect gear 46 to shaft 40; (2) When synchronous speed is reached, flange 60a moves further to the right to engage the synchronizer jaw clutch; (3) Clutches 82 and 48 are deactuated and actuated, respectively; and (4) Flange 96a is moved back to neutral. Third gear is now fully engaged and the torque converter is automatically bypassed.

The sequence for upshifting to fourth gear should be obvious from the foregoing and it should suffice to say that synchronizer 74 is actuated to the right, clutches 48 and 82 are deactuated and actuated, respectively, and synchronizer 42 is disengaged.

Downshifting from fourth gear is merely the reverse of the upshift sequence in that the next lower ratio gear is first synchronized with its respective shaft while drive continues in the higher ratio, the drive is then switched from one countershaft assembly to the other by deactuating and actuating the fluid actuated clutches 48 and 82.

Assuming now that the vehicle operator wishes to move the vehicle in the reverse direction, the shift control lever is placed in the reverse position, whereby the control system will connect the torque converter driven shaft to the output shaft through reverse gear 80 and idler assembly 108. The sequence of events to effect drive in reverse may vary; one sequence which may be automatically effected by the control system is as follows: (1) Torque converter driven shaft 26 is pulled down to a low speed by momentarily effecting a driving connection to the output shaft through countershaft assembly 36; this is done by connecting first gear 44 to shaft 40 and momentarily actuating clutch 48 in the manner described for forward drive in first gear; and (2) Clutch member 118, of the clutch assembly 84, is then resiliently moved leftward by actuator 156 to effect interengagement of jaw clutch teeth 118a and 116.

The position of first gear 44 on countershaft 40 and reverse gear 80 on countershaft 72 allows the vehicle operator to power shift between first and reverse. Such power shifting is accomplished by moving the shift control lever between drive and reverse and by programming the control system to momentarily delay or leave reverse clutch 84 engaged and then actuating and deactuating clutches 48 and 82 in accordance with the position of the shift control lever. This facilitates quick reverse to forward power shifting which greatly enhances the operator's ability to rock the vehicle as is often necessary in snow and mud conditions.

Looking now at a feature provided by the arrangement of the helical teeth of the gears in the transmission, it is well known in force analysis of gears having meshed helical teeth that forces acting on the contacting teeth of each gear may be resolved into tangential, radial, and axial components. The tangential force component is useful since it serves to rotate the driven gear. The radial and axial force components on the other hand are not normally useful; they merely add to bearing loads and tend to bend the shaft that the gear is mounted on.

Figure 5:
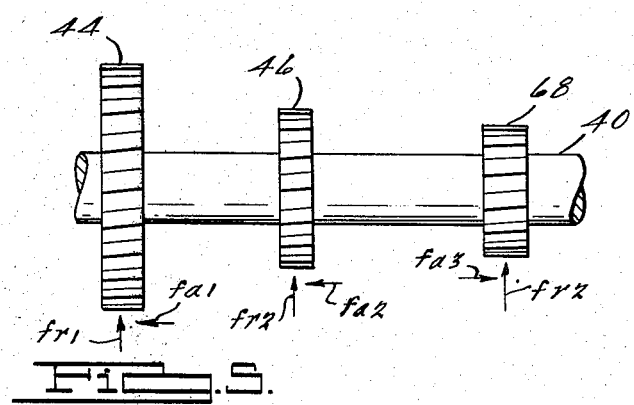
FIG. 5 is a schematic view of a portion of a countershaft assembly of FIGS. 1 and 3.

Looking now at the schematic illustration of FIG. 5, therein is shown gears 44, 46, and 68 which are mounted on countershaft 40. These gears are provided with helical teeth which are arrayed with a helical hand such that the bending moments imposed on shaft 40 by axial force components acting on gears 44, 46, and 68 will subtract from bending memonts imposed on the shaft by radial force components, thereby reducing the net bending forces on shaft 40 to a level less than would be caused if the gears had the opposite hand. More specifically, gears 44, 46, and 68 rotate counterclockwise when viewed from the left end of shaft 40. Gears 44 and 46 are driven gears and gear 68 is a drive gear. The radial forces $fr_1$, $fr_2$, and $fr_3$, acting on these gears all act in the indicated directions and tend to bend or bow the simply mounted shaft 40 upward. To counter the bending forces of $fr_1$, $fr_2$, and $fr_3$, gears 44, 46, and 68 each have left hand helical teeth. Since gears 44 and 46 are driven gears, the axial forces $fa_1$ and $fa_2$ on the helical contact teeth of each will act to the left, thereby imposing a clockwise bending moment on their respective gears which tends to bend or bow shaft 40 downward. Since gear 68 is a drive gear, the axial force $fa_3$ will act to the right, thereby imposing a counterclockwise bending moment on gear 68 which tends to bend or bow shaft 40 downward. Hence, it may be seen that the axial forces subtract from the radial forces to decrease the net bending forces acting on shaft 40. It should be kept in mind that at any given time, only one of gears 44 and 46 are engaged. The magnitude of the axial forces acting on each of the gears 44, 46, and 68 may of course be varied by varying the degree of the helical angle on each gear to balance the forces.

Gears 80, 76, 78, and 104 of countershaft assembly 38 have helical teeth inclined in the same direction as the gear teeth of countershaft assembly 36 and for the same reasons given for shaft 40 of countershaft assembly 36.

The preferred embodiments of the invention have been disclosed for illustrative purposes. Many variations and modifications of the preferred embodiment are believed to be within the spirit of the invention. The following claims are intended to cover the inventive portions of the preferred embodiment and the variation and modification within the spirit of the invention.

What is claimed is:

1. In a powershift transmission of the type including an input drive adapted to be continuously connected to an engine, an output drive adapted to be continuously connected to a load, and first and second intermediate shafts mounted for rotation independent of said drives, the improvement comprising:

first and second input shafts in continuous driving relation with said input drive;

first means operative to synchronize and clutch either of said intermediate shafts with either of said input shafts while said intermediate shafts are drivingly disconnected from said output drive; and second means operative thereafter to alternatively clutch said intermediate shafts with said output drive to effect alternate driving connections between said drives via said intermediate shafts.

2. In a powershift transmission of the type including an input drive adapted to be continuously connected to an engine, an output drive adapted to be continuously connected to a load, and first and second intermediate shafts mounted for rotation independent of said drives, the improvement comprising:

a torque converter continuously connected at its input to said input drive;

a first input shaft continuously connected to the output of said torque converter;

a second input shaft continuously connected to said input drive and bypassing said torque converter;

first means operative to alternately synchronize and clutch either of said intermediate shafts with either of said input shafts while said intermediate shafts are drivingly disconnected from said output drive;

second means operative thereafter to alternately clutch said intermediate shafts with said output drive to effect alternate driving connections between said drives via said intermediate shafts.

3. The transmission of claim 1 or 2, wherein said first means is operative during an upshift sequence of the transmission to first alternately synchronize and clutch said intermediate shafts with said first input shaft and then alternately synchronize and clutch said intermediate shafts with said second input shaft.

4. The transmission of claim 1 or 2 3, further including forward and reverse speed gears respectively associated with said first and second intermediate shafts and, third means for clutching said second intermediate shaft with said first input shaft while said second intermediate shaft is drivingly disconnected from said output drive and while said first means synchronizes and clutches said first intermediate shaft with said first input shaft via said forward speed ratio, and wherein said second means is operative to alternately clutch said intermediate shafts with said output drive to effect a foward-reverse shift sequence of the transmission.

5. The transmission of claim 3, further including forward and reverse speed gears respectively associated with said first and second intermediate shafts and, third means for clutching said second intermediate shaft with said first input shaft while said second intermediate shaft is drivingly disconnected from said output drive and while said first means synchronizes and clutches said first intermediate shaft with said first input shaft via said forward speed ratio, and wherein said second means is operative to alternately clutch said intermediate shafts with said output drive to effect a forward-reverse shift sequence of the transmission.

6. In a powershift transmission of the type including input and output drive means, first and second shafts disposed between the drive means, and first and second power paths disposed between the drive means and alternately connectable between the drive means via the shafts, the improvement comprising:

first means selectively operative to effect driving connections including the first shaft, either of the power paths, and one of the drive means;

second means selectively operative to effect driving connections including the second shaft, either of the power paths, and said one drive means; and first and second friction clutches for completing the driving connections effected by said first and second means, one of said friction clutches engagable substantially simultaneously with disengagement of the other friction clutch, whereby the first and second power paths are alternately connected between the input and output drive means.

7. In a power shift transmission of the type including at least first and second power paths alternately connectable between input and output drive means, the improvement comprising:

first and second input shafts;
input gear means nonrotatably fixed to each of said input shafts;
first and second driven gears disposed respectively in said first and second power paths and in constant mesh with said input gear means of said first input shaft;
third and fourth driven gears disposed respectively in said first and second power paths and in constant mesh with said input gear means of said second input shaft;
synchronizer clutch means disposed in each of the power paths and selectively engagable to effect driving connections including one of said input shafts, one of said power paths, and one of said drive means; and
first and second friction clutches for completing the driving connections effected by said first and second means, one of said friction clutches engagable substantially simultaneously with disengagement of the other friction clutch, whereby the first and second power paths are alternately connected between the input and output drive means.

8. The transmission of claim 6, wherein the first power path includes first and third speed ratios, the second power path includes second and reverse speed ratios, said driving connections effected by said first means includes said first and third ratios, and said driving connections effected by said second means includes said second and reverse ratios.

9. The transmission of claims 6, 7, or 8, further including:
a fluid coupling interposed between the input drive means and the first input shaft.

10. The transmission of claim 7, wherein said first, second, and third driven gears are first, second, and third speed ratio gears; and said fourth driven gear is a reverse speed ratio gear.

11. The transmission of claims 8 or 10, further including:
a fluid coupling interposed between the input drive means and the first input shaft, whereby said first, second, and reverse speed ratios may be driven by said torque converter.

12. In a transmission of the type including first and second countershafts, an output shaft, means mounting said shafts for rotation independently of each other, two ratio gears and a drive gear rotatably supported by each countershaft, and output gear means non-rotatably fixed to said output shaft and in mesh with said drive gears, the improvement comprising:

first and second input shafts adapted to be driven by a common source of power, said first input shaft driven by a fluid power means interposed between said source and said first input shaft, and said second shaft directly driven by said source;

input gear means non-rotatably fixed on each of said input shafts, said first input shaft gear means in mesh with one of said ratio gears on each countershaft, and said second input shaft gear means in mesh with the other of said ratio gears on each countershaft; and first and second clutch means associated with each countershaft, said first clutch means for clutching either of said ratio gears to its respective countershaft, and second clutch means for clutching said drive gear to its respective output shaft.

13. In a transmission comprising:
input drive means adapted to be rotatably driven by an engine;
fluid coupling means including an impeller driven by said drive means and a turbine driven by said impeller;
a turbine driven input shaft in continuous drive relation with said turbine and having gear means non-rotatably fixed thereon;

a bypass input drive shaft in continuous drive relation with said input drive means and having gear means non-rotatably fixed thereon;

an output drive shaft having gear means fixed thereon; and at least two countershafts alternately connectable between said input shaft and said output shaft, each countershaft including at least two alternately selectable ratio gears rotatably supported thereon, one of said gears being in continuous mesh with said gear means fixed on said turbine driven shaft and the other gear being in continuous mesh with said gear means fixed on said bypass shaft, an output drive gear in continuous mesh with said gear means fixed on said output shaft, first means for selectively synchronizing and clutching either of said alternately selectable ratio gears with said countershaft, and second means for clutching said countershaft with said output gear.

14. A transmission comprising:

first and second input shaft means adapted to be rotatably driven by a common source of power, said first shaft being driven by a fluid power means interposed between said source and said first shaft, and said second shaft being directly driven by said source;

input gear means non-rotatably fixed to each of said input shafts;

an output shaft mounted for rotation and having output gear means non-rotatably fixed thereon;

first and second countershafts mounted for rotation;

first and third speed ratio gears rotatably supported by said first countershaft and second and fourth speed ratio gears rotatably supported by said second countershaft, said first and second speed ratio gears in mesh with said first input shaft gear means, and said third and fourth speed ratio gears in mesh with said second input shaft gear means;

first and second double acting synchronizer clutches associated with said first and second countershafts respectively and disposed between said first and third speed ratio gears and between said second and fourth speed ratio gears, respectively, each synchronizer clutch selectively operative to synchronize and clutch its associated countershaft with either of the gears it is disposed between;

drive gear means rotatably supported by each of said countershafts and in mesh with said output gear means; and first and second clutch means associated with said first and second countershafts respectively and said drive gear means supported thereon, each of said clutch means selectively operative to clutch its associated countershaft and drive gear means together.

15. In a transmission of the type including first and second countershafts, an output shaft, means mounting said shafts for rotation independently of each other, two ratio gears and a drive gear rotatably supported by each countershaft, and output gear means non-rotatably fixed to said output shaft and in mesh with said drive gears, the improvement comprising:

first and second input shafts adapted to be driven by a common source of power, said first input shaft driven by a fluid power means interposed between said source and said first input shaft, and said second shaft directly driven by said source;

input gear means non-rotatably fixed on each of said input shafts, said first input shaft gear means in mesh with one of said ratio gears on each countershaft, and said second input shaft gear means in mesh with the other of said ratio gears on each countershaft;

first means operative to clutch said first countershaft with either of said ratio gears supported thereby;

second means operative to clutch said second countershaft with either of said ratio gears supported thereby;

third means operative after clutching by said first means to clutch said first countershaft with said drive gear supported thereby; and fourth means operative after clutching by said second means to clutch said second countershaft with said drive gear supported thereby while declutching said third means.

16. The transmission of claim 15, wherein said fluid power means is a fluid coupling.

17. The transmission of claim 15, wherein said first and second means include:

a double acting synchronizer clutch associated with each countershaft and disposed between said ratio gears supported by each countershaft.

18. The transmission of claim 17, wherein said double acting synchronizer clutch includes:

friction clutch means for synchronizing said associated countershaft with either of said ratio gears supported thereby; and a positive clutch for clutching said associated countershaft with the synchronized ratio gear.

19. The transmission of claim 15, further including:

a reverse gear rotatably supported by one of said countershafts;

an idler gear means drivingly interposed between said input gear means and said reverse gear; and means for clutching said reverse gear with said one countershaft.

20. The transmission of claim 19, wherein one of said ratio gears on said first countershaft is a first speed ratio gear and said reverse gear is rotatably supported by said second countershaft, whereby said first speed ratio gear and said reverse gear may be clutched to their respective countershaft and said transmission may be power shifted between first gear and reverse gear by alternately clutching and declutching said third and fourth means.

21. The transmission of claim 15, wherein said means mounting said countershaft includes first and second spaced apart bearings, said two ratio gears and said drive gear supported by each countershaft are disposed between said first and second bearings, and wherein each of said ratio gears and said drive gear supported by each countershaft include:

helical gear teeth defined by said ratio and drive gears, said teeth sloped with respect to the axis of said countershaft such that the forces acting on the helical teeth of each ratio gear and drive gear at their respective points of driving engagement with the input and output gear means have axial force components directed axially away from each other, whereby said axial forces impart bending forces on said countershaft counter to bending forces on said countershaft due to radial force components acting on said helical teeth at said respective points of driving engagement.

22. A transmission comprising:

first and second input shafts adapted to be driven by a common source of power, said first shaft being driven by a fluid power means interposed between said source and said first shaft, and said second shaft being directly driven by said source;

input gear means non-rotatably fixed to each of said input shafts;

an output shaft having output gear means non-rotatably fixed thereon;

first and second countershafts mounted for rotation;

a driven gear and a drive gear rotatably supported by said first countershaft and in mesh with said first input shaft gear means and said output shaft gear means, respectively;

a driven gear and a drive gear rotatably supported by said second countershaft and in mesh with said second input shaft gear means and said output shaft gear means, respectively;

means operative to synchronize said first countershaft with said driven gear supported thereon;

means operative thereafter to clutch said first countershaft with said driven gear supported thereon;

means operative thereafter to clutch said first countershaft with said drive gear supported thereon to effect a driving connection from said first input shaft to said output shaft through said first countershaft;

means operative to synchronize said second countershaft with said driven gear means supported thereon;

means operative after said second countershaft synchronizing to clutch said second countershaft with said driven gear supported thereon; and means operative after said second countershaft clutching to clutch said second countershaft with said drive gear means supported thereon while declutching said first countershaft from said drive gear means supported thereon; thereby effecting a driving connection from said second input shaft to said output shaft through said second countershaft and disconnecting said driving connection through said first countershaft.

23. In a transmission of the type including first and second rotatably supported countershafts, a rotatably supported output shaft having output gear means non-rotatably fixed thereon, two alternately selectable ratio gears rotatably supported by each countershaft, and a drive gear rotatably supported by each of said countershafts and in mesh with said output gear means, the improvement comprising:

a first rotatably supported input shaft having gear means non-rotatably fixed thereon and in mesh with one of said ratio gears supported by each of said countershafts;

a second rotatably supported input shaft having gear means non-rotatably fixed thereon and in mesh with the other one of said ratio gears supported by each of said countershafts;

means operative to sequentially synchronize and clutch said first countershaft with either of said ratio gears supported thereby;

means operative thereafter to clutch said first countershaft with said drive gear supported thereby to effect a driving connection between one of said input shafts and said output shaft through said first countershaft;

means operative to sequentially synchronize and clutch said second countershaft with either of said ratio gears supported thereby; and means operative after synchronizing and clutching said second countershaft to clutch said second countershaft with said drive gear supported thereby while declutching said first countershaft from said drive gear means supported thereby for effecting a driving connection from one of said input shafts to said output shaft through said second countershaft and disconnecting said driving connection through said first countershaft.

24. The transmission of claim 23, further including:

input drive means directly driving said second input shaft; and fluid power means drivingly interposed between said input drive means and said first input shaft.

25. The transmission of claims 23 or 24, wherein said means operative to synchronize and clutch said countershafts with said ratio gears supported thereby includes:

a double acting synchronizer clutch associated with each countershaft and disposed between said ratio gears supported by each countershaft.

26. The transmission of claim 25, wherein said first and second double acting synchronizer clutches each include:

friction clutch means for synchronizing said associated countershaft with either of said ratio gears supported thereby; and a positive clutch for clutching said associated countershaft with the synchronized ratio gear.

27. The transmission of claim 23, wherein each of said rotatably supported countershafts is supported by first and second spaced apart bearings, said two ratio gears and said drive gear supported by each countershaft are disposed between said first and second bearings, and wherein each of said ratio gears and said drive gear supported by each countershaft include:

helical gear teeth defined by said ratio and drive gears, said teeth sloped with respect to the axis of said countershaft such that the forces acting on the helical teeth of each ratio gear and drive gear at their respective points of driving engagement with the input and output gear means have axial force components directed axially away from each other, whereby said axial forces impart bending forces on said countershaft counter to bending forces on said countershaft due to radial force components acting on said helical teeth at said respective points of driving engagement.

* * * * *